Aug. 26, 1930.  S. G. WINGQUIST  1,774,048
HYDRAULIC COUPLING AND CHANGE SPEED GEAR
Filed March 2, 1926   3 Sheets-Sheet 1

INVENTOR:
Sven Gustaf Wingquist
By Attorneys,
Fraser, Myers & Manley

Aug. 26, 1930.  S. G. WINGQUIST  1,774,048
HYDRAULIC COUPLING AND CHANGE SPEED GEAR
Filed March 2, 1926  3 Sheets-Sheet 2

INVENTOR:
Sven Gustaf Wingquist,
By Attorneys,
Fraser, Myers & Manley

Aug. 26, 1930.　　　　S. G. WINGQUIST　　　　1,774,048
HYDRAULIC COUPLING AND CHANGE SPEED GEAR
Filed March 2, 1926　　　3 Sheets-Sheet 3

INVENTOR:
Sven Gustaf Wingquist
By Attorneys,
Fraser, Myers & Manley

Patented Aug. 26, 1930

1,774,048

UNITED STATES PATENT OFFICE

SVEN GUSTAF WINGQUIST, OF GOTTENBORG, SWEDEN

HYDRAULIC COUPLING AND CHANGE-SPEED GEAR

Application filed March 2, 1926, Serial No. 91,758, and in Sweden November 2, 1925.

The present invention relates to hydraulic coupling and change speed gears, and in particular to such as operate according to the so-called differential principle, and which comprise one pumping unit working as a generator (hereinafter called the "delivery pump") and at least one pumping unit which has certain functions similar to those of a motor (hereinafter called the "receiving pump"), the transmission device being equipped with valves for controlling flow of liquid to the receiving pump. The different transmission or "gearing" ratios are attained through setting of these valves.

In such devices idling is accomplished by connecting the pressure chamber of the delivery pump with a suction chamber or reservoir common to both pumps. A positive driving ratio or "gearing" is obtained by connecting the pressure chambers of the said delivery and receiving pumps. Direct coupling, finally, is obtained through closing the pressure chambers of the delivery pump, so as to entirely shut off its connection both with the common suction or idle fluid chamber and also with the pressure chamber of the receiving pump. Thus the device is fluid locked and caused to rotate as one piece, constituting a direct hydraulic coupling.

It has been proposed before to make these different connections either by means of hand-regulated valve devices or through automatically working valve devices operated, for instance, by hydraulic pressure, centrifugal force or springs.

These valve devices, however, have heretofore been made separate from each other, so that idling has been obtainable independently of the setting of the device for direct coupling or a gearing ratio. This has caused difficulties in the setting of the different valve devices, so that the desired sequence of their functions could not be secured under all circumstances, and besides the devices have been unnecessarily complicated.

The purpose of the present invention is to avoid these inconveniences. An important object of the invention is to effect either idling, gearing, or direct coupling, by a single valve arranged between the cooperating pressure chambers in the delivery and receiving pumps. This valve is equipped with regulating openings so arranged that in changing from idling to direct coupling, or the reverse, the "gearing" position first must be passed through.

The invention thus provides a simpler design and a more advantageous mode of operation, so that in using the device in, for example, a motor vehicle, it always can be assured that the vehicle will be started gradually, with avoidance of the possibility that the change from reduced "gear" to direct coupling may take place before the idling arrangement is out of function.

The operation of the valve, which could be done by hand, is conveniently performed automatically, for instance by the influence of centrifugal force, hydraulic pressure and springs, or by one or two of these forces combined.

The accompanying drawings show a design of a hydraulic coupling and change speed gear founded on the differential principle and made in accordance with the present invention.

Figure 9:
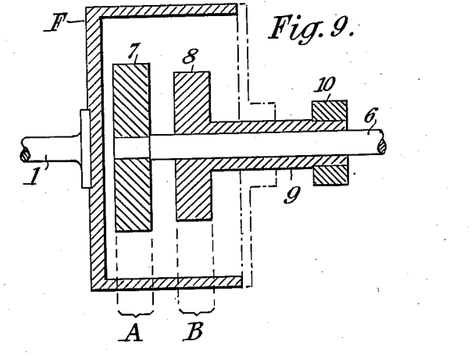
Fig. 9 is a diagrammatic axial cross-section corresponding to the view shown in Fig. 1, simplified to make clear the relationship of the rotors and stator.

The differential pumping transmission according to the present invention includes, (1) a driving shaft 1 securely connected to a driving rotor or casing F consisting of the central transverse partition and covers 2, 3 and 4 and cylindrical housing 5, all secured together; (2) a driven shaft 6, keyed to a driven rotor 7, and (3) a stator 8 having a tubular hub 9 passing out through the central partition 3 and cover 4, and at the free outer end of which is fastened a stator braking device 10, so that the rotation of stator 8 may be prevented to afford the "gearing down" action or the stator may be released so that it may freely rotate with the casing and rotor 7 to prevent all unnecessary relative movement of the parts when the coupling is set for direct drive. These devices constitute a delivery pump A, and a "receiving pump" or fluid motor B, as will be described. They are shown diagrammatically in Fig. 9.

In the rotor 7 and in the releasable stator 8 are mounted in any known way, radially movable vanes 11, 12, which are controlled by means of rollers 13 working in cam slots 14 in the covers 2, 3 and in the partition 15 of housing 5, so that the vanes are moved outward in contact with the working surfaces 16 and 17 respectively in the housing (Figs. 2 and 3) and drawn inward so that they clear the abutments 18 or 19 respectively located in the housing. On one side of the abutments 18, 19 are formed pressure chambers 20 or 21, and on the opposite side suction chambers 22, the latter being in direct connection with each other and having a suction chamber or reservoir common to both pumping units. Between the pressure chambers 20, 21 of the pumping units are pressure conduits 23, which as shown are two in number, because the pumping units in the design shown are of the duplex or bipolar type, i. e., each has two abutments. The pumping unit or delivery pump A is thus constituted by the rotating housing 5 which carries abutments 18 and working surfaces 16, and by the rotor 7 in which are mounted the vanes 11 (see Fig. 2); and the motor element or receiving pump B is constituted by the housing 5 with the abutments 19 and working surfaces 17, and the stator 8 with its vanes 12 (see Fig. 3).

Figure 2:
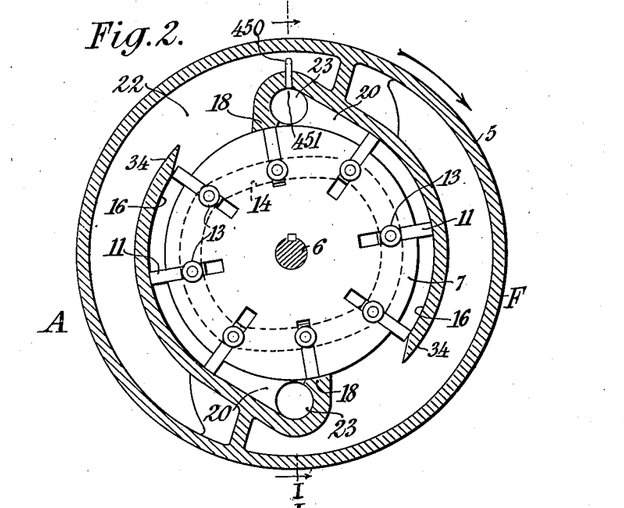
Fig. 2 is a cross-section through the delivery pump along the line II—II in Fig. 1.
Figure 3:
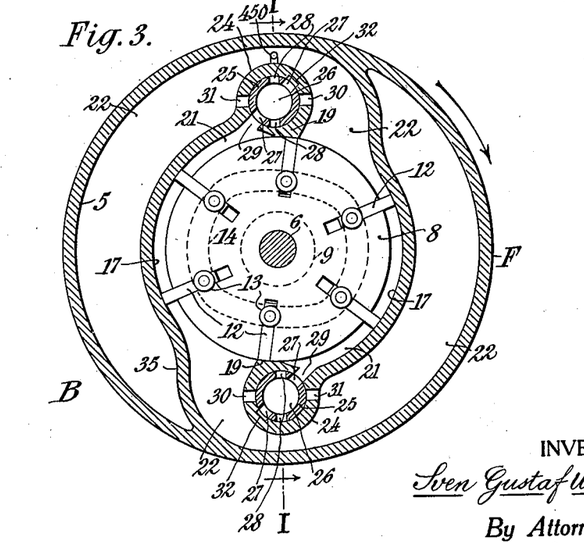
Fig. 3 is a cross-section through the receiving pump along the line III—III in Fig. 1.

If the driving rotor F i. e., the casing common to both the pump A and motor B is put in rotation in the direction of the arrow in Figs. 2 and 3, and if the pressure conduits 23 between the pressure chambers 20, 21 are closed, the driving liquid will evidently be enclosed in the pressure chambers 20 of the delivery pump between the abutments 18 and co-operating vanes 11. The driven rotor 7 with the shaft 6 will consequently be caused to rotate with the driving rotor F on shaft 1, being hydraulically locked or coupled thereto. The device in this condition acts as a direct coupling. The stator 8 for this operation must be released so as to turn idly with the driving rotor.

Assuming that thereafter the pressure conduits 23 are opened, the liquid will then be forced from the pressure chambers 20 of the delivery pump A through the conduits 23 to the pressure chambers 21 of the receiving pump B, and from the latter the liquid is led through the common suction chamber 22 back to the suction chamber of the delivery pump A, thereby circulating liquid between the delivery pump and receiving pump. The stator 8, with its vanes 12, is during this operation prevented from turning backward (as will be later described). Under this condition the torque of the driven shaft 6 is increased and its relative velocity of rotation is decreased, the driving ratio between the shafts 1 and 6 being directly dependent on the relative volumetric capacity of the pumps A, B.

If, finally, a direct connection is established between the pressure chambers 20 of the delivery pump and the common suction chamber 22 then evidently the liquid can freely circulate between the pressure and suction chambers of the pump A without creating any appreciable driving pressure. Thus the driven rotor 7 with the shaft 6 will cease to rotate and in this manner idling is effected, it being understood that also under these conditions the stator 8 should be released, as will hereinafter be explained.

The above-mentioned three driving conditions according to this invention, are established through one single valve (that is, one for each pressure chamber in the delivery pump) in such a way that in shifting the valve from idling to direct coupling position, the intermediate gearing position must be passed.

For this purpose in the casing 5 at the abutments 19 valve seats or casings 24 are formed, in which sleeve valves 25 are adapted to freely rotate. The interior chambers 26 of the said valves are directly connected with and form a continuation of the pressure conduits 23. The valves 25 are formed with two diametrically-opposite ports or openings 27, 27, and with two other diametrically-opposed openings 28, 28, which can be brought into correspondence with analogous ports or openings in the valve seats 24, namely, with a channel 29 leading to the pressure chamber 21 of the motor element B, and with diametrically-opposite ports 30, 31, leading to the common suction chamber 22. Furthermore, there is in the valve seat 24 a recess 32 located diametrically opposite the channel 29 and which should be of the same area as the latter. The recess 32 affords a balancing area, being connected either through one of the ports 27 or by a groove 33 on the outside of the valve with either the chamber 26 within the valve, or with the port 30, and thus with the suction chamber 22. The groove 33 is so located that it brings the recess 32 into communication with the suction chamber as soon as the valve 25 has closed the channel 29, so that the pressure in these channels corresponds with that in the suction chamber 22 of the receiving pump. Thus on account of the diametrically opposite location of the openings and channels the valve will be almost balanced with respect to fluid pressure, so that there is an almost complete absence of side thrust, and consequently there is comparatively inconsiderable resistance to rotation even when a high liquid pressure exists in the valve chamber 26.

Figures 5, 6, 7:
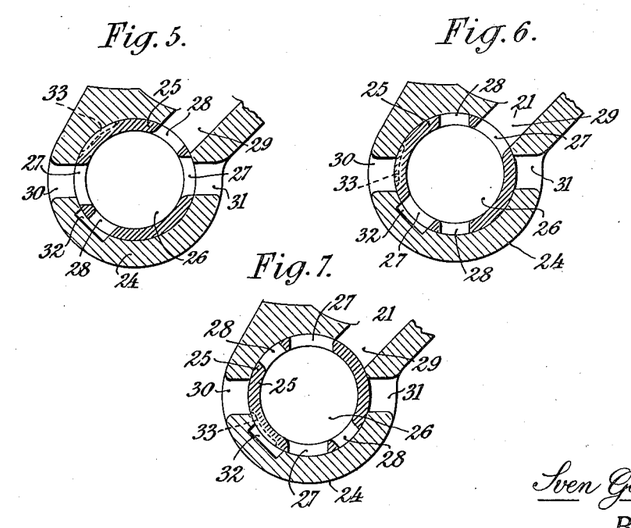
Figs. 5–7 are cross-sections on a larger scale of the regulating valve, showing its three different positions, viz., for idling, for "gearing", and for direct coupling, which sections also are seen from the left in Fig. 1.

In the valve position shown in Fig. 5 the chamber 26 of the valve 25 is, through the openings 27 and the ports 30, 31, in direct connection with the common suction chamber 22 (Figs. 2 and 3) and consequently the pressure chambers 20 of the delivery pump are, through the pressure conduits 23, which open into the valve chambers 26, also in direct connection with the suction chamber. In a similar way the pressure chamber of the receiving pump is in connection with the suction chamber through the channel 29 and port 28 to the chamber 26, the openings 27 and the ports 30, 31. All the pressure chambers are consequently in connection with the suction chamber, with the result that the fluid can freely circulate without generating pressure so that free engine or idling is obtained.

If now the valve 25 is turned one step in counter-clockwise direction to the position shown in Fig. 6, the connection between the valve chamber 26 and the suction chamber is shut, and connection is established between said chamber 26 and the pressure chamber 21 of receiving pump B through one of the openings 27 and channel 29. The opposite opening 27 will thereby be connected with the recess 32 of the valve seat 24 which causes in the way already stated a balancing of the valve against the liquid pressure. Then from the delivery pump liquid under pressure enters through conduit 23 to the chamber 26, and flows by the first-mentioned opening 27 and the channel 29 into the pressure chamber 21 of the receiving pump B as before described, whereby intermediate speed or "gearing" is established.

When the valve 25 is turned a further step in the given direction, i. e., to the position shown in Fig. 7, the connection between the pressure chamber 20 of the delivery pump A and both the suction chamber and pressure chamber of the receiving pump B will be entirely closed, and as before described the fluid will be sealed in the pressure chamber of the delivery pump, so that direct coupling is obtained. Consequently the middle position always must be passed when changing from idling to direct coupling or reverse, i. e., the device must be set for intermediate gearing. As mentioned before, it can thus always be effected that the acceleration from a standing start of, for instance, a motor vehicle, equipped with a device in conformity with the invention, is achieved through positively co-ordinated operations of the valve means, and the proper relative timing of the clutching (the gradual reduction of hydraulic slip), gearing, and direct driving functions of the transmission is insured. In this way a smooth start is readily obtained.

Figures 4, 8:
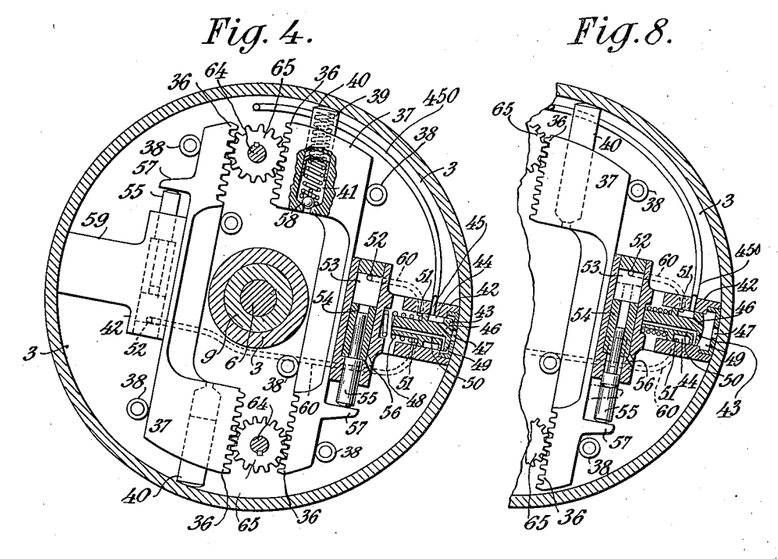
Fig. 4 is a cross-section along the line IV—IV in Fig. 1. All sections are seen from the left in Fig. 1.
Fig. 8 is a fragmentary cross-section similar to Fig. 4 except that it shows the pilot valve and main valve actuating piston in the position corresponding to idling or free engine.

In Figs. 4 and 8 is shown a device for automatic regulation of the valves but it will be understood that the valves may be operated in any other suitable manner.

Figure 1:
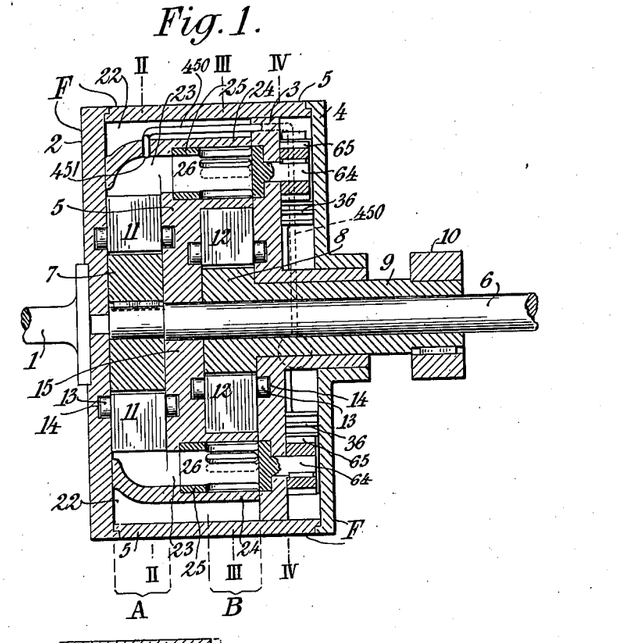
Figure 1 is an axial section of the device in the planes of the line I—I in Figs. 2 and 3.

In the preferred embodiment of my invention, the valves 25 have each a valve spindle 64 which passes through the cover 3 and has fastened on it a toothed pinion 65. The pinions 65 mesh with four racks 36, fastened to or formed with weights 37, which are mounted as slides and guided between rollers 38. As the mass of these weights is chiefly located at their one end, the centrifugal force, when the system is set in rotation, seeks to throw this end outward with a force dependent on the rotational velocity. This movement of the weights 37 is counteracted partly by springs 39, enclosed in pistons 40, guided in cylindrical bores 41 in the weights, and partly by the liquid pressure that is working on piston devices, enclosed in housings 42 projecting from or fastened to the cover 3. These piston devices consist first of one auxiliary or pilot valve 43, shown as a plunger having an annular channel 44, which through a port 45 is always connected with the pressure chambers of the delivery pump, i. e., either with one of them, or preferably with both pressure chambers 20. This connection may conveniently be made through a tube 450 (Fig. 4) which extends from an inlet 451 (Fig. 1) to the port 45. The channel 44 is further by means of a hole 46 in the valve 43, put in connection with a chamber 47 at the outer end of the valve. Thus, the pressure tends to bring the valve 43 inward against the action of the centrifugal force and a spring 48. In its outer position the valve divides chamber 47 into two parts, of which the annular outer part 49 is connected with the suction chamber through a bore 50 in the valve, but as soon as the valve starts to move inward, the bore 50 will be closed, and the liquid pressure then acts on the entire outer valve surface instead of as before only on the smaller circular central part. Thereby the inward movement of the valve is secured; and also the valve cannot move outward before either the liquid pressure has decreased considerably, or the number of revolutions is increased, or both have been changed, so that no uncertain action can take place. Inside the valve housing 42 are two ports 51, which by means of pipes or channels 60, are connected with ports 52 in piston chambers 53, formed in the housings 42. The port 52, in the outer position of the pilot valve, is in direct connection through port 51 with the suction chamber 22; while in the inner position of the pilot valve the ports 51 are in communication through the annular channel 44 with the port 45 and consequently receive pressure from the pressure chambers 20, whereby this pressure is communicated to the piston chambers 53. Accordingly, the ports 52 are in communication either with the suction chamber or the pressure chamber, according as the pilot valve 43 is in its outer or inner position.

The piston chambers or cylinders 53 contain coaxial co-operating pistons 54 and 55, the former being annular and enclosing the latter; the piston 55 is equipped with a shoulder against which the annular piston 54 rests. The opposite end of each cylinder 53 is, through a suitable hole 56, in communication with the suction chamber.

If now the liquid under pressure enters through the ports 52, it acts on the annular pistons 54 and also on the centrally exposed portion of the pistons 55, and presses all said pistons outward. The pistons 55 push against extensions 57 of the weight members 37, and move the weights which, through the rack and pinion connections, rotate the valves 25. As soon as the annular pistons 54 are checked at the bottom of the cylinders 53 the pistons 54 cease to push on the pistons 55, and the weights 37 and valves 25 are thereby partially relieved from the effect of fluid pressure. The pressure is now acting solely on the smaller pistons 55 which will continue their movement only if the liquid pressure and the stress of the springs 39 are sufficiently large compared to the centrifugal force of the weights 37. If this is the case, the weights are forced back until they have reached their innermost position. The valves 25 are then in the position shown in Fig. 5 (idling).

When the device is at rest the weights 37 are always pressed to their inner position by the springs 39. The pilot valve 43 is also kept in its outer and closed position by the spring 48.

If shaft 1 and the common casing F are set in rotation the centrifugal force of the weights 37 increases gradually until it is able to overcome the force of the springs 39 and the weights are thrown to their outer position. But the pistons 40 have only a fairly close fit in their sockets 41, so that they act as dash-pots or oil-brakes, preventing a too sudden movement. The weights 37 will consequently move outward with moderate speed, even if the speed of shaft 1 should increase rapidly, and successively turn the valves 25 from the position shown in Fig. 5 to the one shown in Fig. 6. The pressure in the pressure chambers 20, 21 gradually increases on account of the throttling of the idling channels 30, 31, until the rotor 7 with shaft 6 is caused to rotate, thus starting the vehicle. Should, under light load conditions as in starting down hill, the pressure necessary to acelerate the vehicle be so small that the pilot valve 43 does not open, the centrifugal force of the weights 37 will continue to move the weights outward, thus turning the valve 25 to the position shown in Fig. 7 (direct coupling). If, on the other hand, the pressure should be higher, which is usually the case, the pilot valve 43 is automatically opened and pressure thereby admitted to the cylinders 53 behind the pistons 54, 55. Under these conditions a considerably higher velocity of shaft 1 will be necessary to make the weights 37 continue their closing of the valves 25 because such closing is resisted by fluid pressure.

When the weights are in their inner position only the pressure of the central pistons 55 acts thereon and so the weights move outward to their middle position (Fig. 4) against relatively small fluid resistance, this position corresponding to the intermediate speed or "gearing" position of the valves 25. In this position the annular pistons 54 become operative and the pressure from said pistons thereafter prevents further outward movement of the weights and corresponding inward movement of the pistons, until the number of R. P. M. has further increased or the pressure decreased to such an extent that the pilot valve 43 is moved outward, i. e., until the conditions of speed or load have become such that direct coupling should be effected.

The bores 41 for the dashpot pistons 40 are each suitably provided at the bottom with a ball valve 58 or other similar arrangement so that the dash-pot action only retards the movements which tend to establish high gear or direct drive while permitting free movements in the opposite direction, i. e., toward free engine.

As the weights 37 are equipped each with two racks 36 which are in mesh with both pinions 65, the weights and valves are always guided in the same way and their movements are symmetrical, so that the revolving parts are in dynamic balance.

Diametrically opposite to the pilot valve 43 is located a counterbalancing weight 59 which may be conveniently formed as part of the cover 3 and suitably designed to balance the weight of the pilot valve device. It is to be understood that the invention is not limited to a transmission employing "duplex" vane pumps, but is applicable to transmissions using any known type of pump elements and transmission having any number of such elements.

The adjusting devices for the valves can also be made in other ways, the embodiment hereinbefore described being merely one possible example. The straight line movement of the various controlling parts is not essential nor is it essential that the pressure-actuated pistons 54, 55 be duplicated. The pilot valve is not necessary either, but the device can be so formed that the cylinders 53 are always connected with the pressure chamber of the delivery pump through the ports 52.

The present application is based upon an application filed by me in Sweden November 2, 1925, No. 3,645/25.

My present invention is a further development or improvement, and in great part a reconstruction, of certain prior inventions directed to the same purpose, which are the subject-matter of certain of my patents and patent applications in the United States, viz:

Patent No. 1,603,179, granted October 12, 1926, disclosing a rotary vane pump transmission for accomplishing the several coupling and gearing connections required in, for example, a motor car, and in which the flow of liquid from a pumping element into one or more receiving motors is governed by a valve or valves under manual control, and there is a stator which may rotate, but is held stationary, when needed, by means of a stator brake.

Patent No. 1,701,903, granted February 12, 1929, which discloses a similar rotary pump system wherein the liquid circulation is controlled by valves operated automatically in response to variations in speed and internal fluid pressure corresponding to changes in the torque or load. In this patent the valve control is accomplished through a radially-movable part which moves outwardly under centrifugal force and is pressed inwardly by fluid pressure.

Patent No. 1,673,542, granted June 12, 1928, which discloses an apparatus for the like purpose, in which the main valve controlling the liquid circulation is itself controlled by an auxiliary or pilot valve responding oppositely to centrifugal force and fluid pressure.

Patent No. 1,610,405, granted December 14, 1926, which discloses generally similar rotary vane pump mechanisms for performing the same functions, and wherein the valve which is subject to fluid pressure operation presents a reduced area to the fluid pressure when closed, and an increased area thereto when open, in order to effect the gear changes to some extent in steps instead of solely in a gradual manner.

My present invention may be variously embodied, and is subject to considerable modification according to the precise function to be served, and according to the engineering judgment of those skilled in the art; and such variations may be made without departing from the invention, within the scope of the appended claims.

What I claim is:

1. A hydraulic power transmission device of the differential pumping type adapted to vary the relative motion between driving and driven elements, said device having a valve between its delivery pump and receiving pump, said valve having successive operating positions resulting in conditions of idling, gearing, and direct drive, and automatic control means for said valve responding to varying operating conditions, said control means having a plurality of distinct operative positions, each of which are automatically maintained over a predetermined range of operating conditions, and said control means being adapted under opposed conditions to either close the valve to hydraulically couple driving and driven elements together for direct drive, or open the valve to permit free circulation between the pressure and suction chambers of the delivery pump for idling, and in an intermediate condition to direct the liquid from the delivery pump into the fluid receiving pump for gearing down, adapted in passing from either opposed condition to the other to traverse said intermediate condition.

2. A power transmission device according to claim 1, the automatic control means for said valve being adapted to respond to centrifugal force, whereby to be controlled according to variations in speed.

3. A power transmission device according to claim 1, the automatic control means for said valve adapted to respond to centrifugal force and to liquid pressure generated by the delivery pump, whereby to be controlled according to variations in both speed and liquid pressure, the presure being a function of the load torque.

4. A hydraulic coupling and change speed mechanism of the described type, having a valve between its delivery pump and its receiving pump, and automatic control means for said valve comprising a part responding to centrifugal force, and means for applying liquid pressure generated by said delivery pump to said part in opposition to said centrifugal force.

5. A hydraulic coupling and change speed mechanism of the described type, having a valve between its delivery pump and its receiving pump, and automatic control means for said valve, said means receiving the effect of centrifugal force and being adapted to respond to a change in said force, and fluid pressure means acting on said valve control means in different positions with different effective pressure areas whereby a continuous change in centrifugal force will move the valve intermittently from one controlling position to another.

6. A hydraulic coupling and change speed mechanism of the described type, having a valve between its delivery pump and its fluid receiving pump, and automatic control means for said valve receiving the effect of centrifugal force and the effect of liquid pressure, said control means having in different positions different pressure sensitive areas whereby said means is adapted to respond intermittently to a continuous change in said forces and thereby to move the valve step by step from one control position to another.

7. A hydraulic coupling and change speed mechanism of the described type, having a valve between its delivery pump unit and its receiving pump, automatic control means for said valve comprising a weight affected by centrifugal force, and a pressure-actuated means acting oppositely to centrifugal force, with two different effective pressure areas whereby said means is adapted to respond to a change in pressure only when such change reaches a predetermined value.

8. A hydraulic coupling and change speed mechanism of the described type, having a valve between its delivery pump and its receiving pump, automatic control means for said valve comprising a weight affected by centrifugal force, and a pressure-actuated means acting oppositely to centrifugal force, comprising two pressure-receiving parts, each presenting its area to the pressure, both movable over a given range, and means for stopping one at the end of such range so that an increased pressure is required to further move the other part.

9. A hydraulic coupling and change speed mechanism of the described type, having a valve between its delivery pump and its receiving pump, and automatic control means for said valve receiving the effect of centrifugal force, and oppositely-acting means receiving liquid pressure, comprising coaxial moving parts, the one having a restricted movement and the other a more extended movement.

10. A hydraulic coupling and change speed mechanism of the described type, having a valve between its delivery pump and its receiving pump, and automatic control means for said valve receiving the effect of centrifugal force, and oppositely-acting means receiving liquid pressure, comprising inner and outer plungers, the one having a limited range of movement and the other a more extended range.

11. A hydraulic coupling and change speed mechanism of the described type, having a valve between its delivery pump and its receiving pump, automatic control means for said valve receiving the effect of centrifugal force, and oppositely-acting means receiving liquid pressure, comprising inner and outer plungers, a cylinder in which they move having means for stopping the outer plunger after a limited range of movement, and the inner plunger capable of a greater range of movement.

12. A hydraulic coupling and change speed mechanism of the described type, having a rotary valve between its delivery pump and its receiving pump, and automatic control means for said valve comprising a moving part connected to rotate said valve and acted on oppositively by centrifugal force and fluid pressure from said delivery pump.

13. A hydraulic coupling and change speed mechanism of the described type, having a rotary valve between its pumping units, and automatic control means for said valve comprising a weight formed as a slide having a rack portion, and a pinion connected to said valve and meshing with said rack portion, and means subjected to fluid pressure and acting against said weight oppositely to centrifugal force.

14. A hydraulic coupling and change speed mechanism of the described type, having a rotary valve between its pumping units, and automatic control means for said valve comprising a pinion on said valve, a rack meshing therewith and a weight connected to said rack for receiving centrifugal force, and counteracting means acted on by fluid pressure.

15. A hydraulic coupling and change speed mechanism of the described type, having a rotary valve between its pumping units, and automatic control means for said valve comprising a pinion connected to said valve and racks meshing with opposite sides of said pinion adapted to be oppositely acted on by centrifugal force, and counteracting means acted on by fluid pressure.

16. A hydraulic coupling and change speed mechanism of the described type, having a rotary valve between its pumping units, and automatic control means for said valve comprising a pinion connected to said valve and racks meshing with opposite sides of said pinion adapted to be oppositely acted on by centrifugal force, and pressure-actuated means acting on said respective racks in directions contrary to the effect of centrifugal force.

17. A hydraulic change speed mechanism of the described type having opposed pumping units with two valves between them and automatic control means for said valves comprising pinions connected to the valves, and centrifugally-actuated racks engaging both pinions on opposite sides to equally turn both valves.

18. A hydraulic change speed mechanism of the described type having opposed delivery and receiving pumps with two valves between them and automatic control means for said valves comprising pinions connected to the valves, centrifugally-actuated racks engaging both pinions on opposite sides to equally turn both valves, and pressure-receiving means acting on said racks oppositely to the effect of centrifugal force.

19. A hydraulic change speed mechanism of the described type, having a rotary valve between its delivery and receiving pumps and automatic pressure-sensitive control means for said valve comprising duplicate and symmetrically balanced parts responding alike to varying conditions, whereby to attain dynamic balance.

20. A hydraulic change speed mechanism of the described type, having duplex delivery and receiving pumps with two rotary valves between them, automatic pressure and speed sensitive control means for said valves comprising duplicate and symmetrically balanced parts responding alike to varying conditions, and connected alike to both valves to move them in unison.

21. A hydraulic power transmission device of the described type including means for producing direct drive, reduced gear drive, and free engine, a centrifugally-movable member controlling said means, and fluid retarding means for moderating the movements of said member.

22. A hydraulic power transmission device of the described type including a centrifugally-movable controlling member enclosed in a liquid chamber, said member enclosing one end of a spring-pressed plunger, said plunger being adapted to utilize the liquid in said chamber to afford in cooperation with said member, a dashpot to retard the movement of said member.

23. A hydraulic power transmission device of the described type including a centrifugally-movable controlling member enclosed in a liquid chamber, said member enclosing one end of a spring-pressed plunger, and a valved connection for passing liquid from said chamber to the enclosed end of said plunger.

24. A hydraulic power transmission device of the differential pumping type, having a valve between its delivery pump and its receiving pump, a centrifugally-movable weight acting on said valve, and a dash pot for moderating the movement of said weight.

25. A hydraulic power transmission device of the differential pumping type, having a valve between its delivery pump and its receiving pump, a centrifugally-movable weight acting on said valve, and a dash pot adapted to retard the outward movement of said weight.

26. A hydraulic power transmission device of the described type having a valve between its delivery and receiving pumps, a centrifugally-movable weight acting on said valve and retarding means utilizing idle transmission fluid and adapted to moderate the outward movement of the weight, while permitting it substantially free inward movement.

27. A hydraulic power transmission device of the described type having a valve between its delivery and receiving pumps, a centrifugally-movable weight acting on said valve and a hydraulic plunger for moderating its movement, said plunger having a check-valve for freely admitting liquid when moving in one direction and confining the liquid to afford retardation when moving in the opposite direction.

28. A hydraulic power transmission device of the described type including a centrifugally-movable controlling member having a plunger working within it and a spring acting on said plunger.

29. A hydraulic power transmission device of the described type including a centrifugally-movable controlling member having a plunger working within it and a spring acting on said plunger, and a check-valve for admitting liquid to the plunger when moving in one direction.

30. A hydraulic power transmission device having delivery and receiving pumping units and a controlling valve, with operating means for said valve comprising a cylinder and plunger, and a pilot valve responding to centrifugal force and fluid pressure and controlling the admission of liquid pressure to said cylinder.

31. A hydraulic power transmission device having delivery and receiving pumping units and a controlling valve, with operating means for said valve comprising two cylinders and plungers, and a pilot valve responding to centrifugal force and pressure and controlling the admission of liquid pressure to said cylinders.

32. A hydraulic power transmission device having delivery and receiving pumping units and a controlling valve, with operating means for said valve comprising a cylinder and plunger, and a pilot valve responding to centrifugal force and spring pressure and liquid pressure, said pilot valve presenting a varying area to liquid pressure in its different positions.

33. A hydraulic power transmission device having delivery and receiving pumping units and a controlling valve, with operating means for said valve comprising a cylinder and plunger, and a pilot valve responding to centrifugal force and spring pressure and liquid pressure, said pilot valve presenting a full area to liquid pressure in its inner position and a reduced area to such pressure in its outer position.

34. A hydraulic power transmission device having delivery and receiving pumping units and a rotary valve, with operating means for said valve comprising two cylinders and plungers acting oppositely to turn the valve in one direction, and a pilot valve responding to centrifugal force and pressure, and controlling the admission of liquid pressure to both cylinders.

35. A hydraulic power transmission device of the described type having a revolving casing and a delivery pump and a receiving pump within it, a main controlling valve, and operating means for said main valve including a cylinder and plunger and a pilot valve therefor, and said casing containing a body of liquid and forming a suction chamber having communication with the suction sides of the said pumps and valves.

36. A hydraulic power transmission device adapted to operate under conditions of direct coupling, positive speed-varying, and idling, said device having a controlling valve whose successive positions of rest determine such respective operating conditions, and automatic means for shifting said valve to its successive controlling positions in response to predetermined variations of load, and means for holding the valve in said respective controlling positions over a certain range of load variations.

37. A hydraulic power transmission device adapted to operate for idling and speed-varying, having a controlling valve which in its several control positions determines the transmission ratio of the device, and automatic means for operating said valve, said means being sensitive to the opposing actions of centrifugal force and load torque, and restraining means adapted to maintain said valve in one or another of its control positions over a predetermined range of variation in the resultant force due to the combined actions of centrifugal force and load torque.

38. A hydraulic power transmission device adapted to operate under conditions of direct-coupling, positive speed-varying and idling, said device having a controlling valve adapted in successive control positions to successively effect said conditions, and automatic means for operating said valve subjected to changing conditions of speed and torque, said means having distinct operative positions in which it sets the valve for direct-coupling and positive speed-varying conditions, said operative positions being automatically maintained throughout predetermined ranges in the combined effect of speed and torque whereby to hold the valve in an appropriate control position until a change in the combined effect of speed and torque occurs which is of sufficient magnitude to warrant a change of drive from positive speed varying to direct-coupling or vice versa.

39. A hydraulic power transmission device having a transmission ratio controlling valve between a delivery pump and a receiving pump, and automatic means for operating said valve, comprising a centrifugally-operated part and a pressure-sensitive element opposing the movement of said part, the latter having means for exerting force due to a given fluid pressure whereby to move the valve to a definite control position, and maintaining means adapted to hold the valve in the said definite position until such pressure increases to a predetermined higher value and thereupon to permit the further movement of said element In witness whereof, I have hereunto signed my name.

SVEN GUSTAF WINGQUIST.